United States Patent
Orler

(10) Patent No.: US 9,076,457 B1
(45) Date of Patent: Jul. 7, 2015

(54) VISUAL REPRESENTATIONS OF AUDIO DATA

(75) Inventor: Joseph Todd Orler, Kirkland, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1848 days.

(21) Appl. No.: 12/014,546

(22) Filed: Jan. 15, 2008

(51) Int. Cl.
| | | |
|---|---|---|
| G10L 21/06 | (2013.01) | |
| G10L 25/00 | (2013.01) | |
| G06F 3/00 | (2006.01) | |
| G10L 21/12 | (2013.01) | |
| G06F 3/16 | (2006.01) | |
| G11B 20/10 | (2006.01) | |

(52) U.S. Cl.
CPC . G10L 21/12 (2013.01); G06F 3/16 (2013.01); G11B 2020/10546 (2013.01); G11B 2020/10555 (2013.01)

(58) Field of Classification Search
CPC ......... G10L 21/06; G10L 21/12; G10L 21/14; G10L 21/10; G06F 3/16; G06F 3/165; G06F 3/167; G11B 2020/10546; G11B 2020/10555; G11B 2020/10564; G11B 2020/10574
USPC .................... 704/276, 278, 224, 200; 700/94; 381/56, 58, 61; 715/716
See application file for complete search history.

(56) References Cited

U.S. PATENT DOCUMENTS

| | | | | |
|---|---|---|---|---|
| 4,868,687 | A * | 9/1989 | Penn et al. ...................... | 360/13 |
| 5,579,463 | A * | 11/1996 | Takano et al. .................. | 345/440 |
| 5,717,869 | A * | 2/1998 | Moran et al. ................... | 715/716 |
| 5,799,280 | A * | 8/1998 | Degen et al. ................... | 704/276 |
| 5,940,573 | A * | 8/1999 | Beckwith ........................ | 386/54 |
| 6,502,045 | B1 * | 12/2002 | Biagiotti ......................... | 702/66 |
| 6,907,284 | B2 * | 6/2005 | Hamilton et al. .............. | 600/511 |
| 7,227,549 | B2 * | 6/2007 | Beasley et al. ............. | 345/440.1 |
| 7,257,452 | B2 * | 8/2007 | Wiser et al. .................... | 700/94 |
| 7,459,898 | B1 * | 12/2008 | Woodings ................... | 324/76.19 |
| 7,548,791 | B1 * | 6/2009 | Johnston ........................ | 700/94 |
| 7,640,069 | B1 * | 12/2009 | Johnston ........................ | 700/94 |
| 7,869,892 | B2 * | 1/2011 | Foust et al. .................... | 700/94 |
| 8,229,754 | B1 * | 7/2012 | Ramirez et al. ............... | 704/278 |
| 2002/0165721 | A1 * | 11/2002 | Chang ............................ | 704/503 |
| 2004/0095381 | A1 * | 5/2004 | McDowell ..................... | 345/740 |
| 2007/0287490 | A1 * | 12/2007 | Green et al. ................... | 455/523 |
| 2008/0120647 | A1 * | 5/2008 | Shin ............................... | 725/37 |
| 2008/0201092 | A1 * | 8/2008 | Connolly ........................ | 702/67 |

OTHER PUBLICATIONS

Rubin, PE 1995. HADES: a case study of the development of a signal analysis system.In A. Syrdal, R. Bennett & S. Greenspan (eds.), Applied Speech Technology. BocaRaton, FL: CRC Press, 501-20.*
Cannam, C., C. Landone, M. Sandler, J. P. Bello. "The Sonic Visualizer: A Visualization Platform for Semantic Descriptors from Musical Signals." In ISMIR 2006 7th International Conference on Music Information Retrieval Proceedings. Victoria, BC, Canada: University of Victoria, 2006, pp. 324-327.*
Hansen, Jesse. "Speech Acoustics Project.". 2002.*
Lee, Eric, Jan Borchers, and Henning Kiel. Scrolling Through Time: Improving Interfaces for Searching and Navigating Continuous Audio Timelines. RWTH, Department of Computer Science, 2006.*
Kreiman, Jody, Bruce R. Gerratt, and Norma Antônanzas-Barroso. "Analysis and synthesis of pathological voice quality." Unpublished users' manual, retrieved Feb. 22, 2006: 2006.*
Gerhard, David, Jarrod Ellis, and S. K. Regina. "Focus-Plus-Context Displays for Audio Interaction." No Date.*
Degen, Leo, Richard Mander, and Gitta Salomon. "Working with audio: integrating personal tape recorders and desktop computers." Proceedings of the SIGCHI conference on Human factors in computing systems. ACM, 1992.*

* cited by examiner

Primary Examiner — Paras D Shah
(74) Attorney, Agent, or Firm — Shook, Hardy & Bacon L.L.P.

(57) ABSTRACT

This specification describes technologies relating to displaying visual representations of audio data for editing. In some implementations a method is provided. The method includes receiving digital audio data, displaying a first visual representation of the audio data in an interface, the visual representation displaying audio data as a function of time on a time axis and a feature on a feature axis, receiving an input to display one or more enlarged views of the visual representation of the audio data, and displaying a visual representation of the one or more enlarged views along with the visual representation of the audio data in the interface.

25 Claims, 7 Drawing Sheets

VISUAL REPRESENTATIONS OF AUDIO DATA

BACKGROUND

The present disclosure relates to displaying visual representations of digital audio data.

Different visual representations of audio data are commonly used to display different features of the audio data. For example, an amplitude display shows a representation of audio intensity in the time-domain (e.g., a graphical display with time on the x-axis and intensity on the y-axis). Similarly, a frequency spectrogram shows a representation of frequencies of the audio data in the time-domain (e.g., a graphical display with time on the x-axis and frequency on the y-axis).

The audio data can be edited. For example, the audio data may include noise or other unwanted audio data. Removing unwanted audio data improves audio quality (e.g., the removal of noise components provides a clearer audio signal). Alternatively, a user may apply different processing operations to portions of the audio data to generate particular audio effects.

SUMMARY

This specification describes technologies relating to displaying visual representations of audio data for editing. In general, in one aspect, a method is provided. The method includes receiving digital audio data, displaying a first visual representation of the audio data in an interface, the visual representation displaying audio data as a function of time on a time axis and a feature on a feature axis, receiving an input to display one or more enlarged views of the visual representation of the audio data, and displaying a visual representation of the one or more enlarged views along with the visual representation of the audio data in the interface. Embodiments of the aspect include systems and apparatuses including computer program products.

Implementations of the aspect can include one or more of the following features. The one or more enlarged views of the visual representation of the audio data can include a portion corresponding to a beginning of the audio data and a portion corresponding to the end of the audio data. Displaying the visual representation of the one or more enlarged views along with the visual representation of the audio data can include generating separate visual representations corresponding to the visual representation and the one or more enlarged views in separate panes of the interface.

The aspect can further include receiving an input to play the audio data, displaying a visual cue of playback location in both the visual representation of the audio data and the visual representation of the portion of the audio data, and skipping playback of audio data outside the enlarged views of the visual representation. The aspect can further include receiving an input identifying a region of the one or more enlarged views of the visual representation, receiving an input to perform an editing operation on the identified region, editing the audio data according to the editing operation, and updating the display of the visual representation and the edited enlarged views to reflect edited audio data.

The aspect can further include receiving an input associated with a first enlarged view to alter a magnification with respect to a first axis and updating the displayed enlarged view while keeping the visual representation of the audio data unchanged. Updating the enlarged view altering the magnification fixes an endpoint of the enlarged view to the updated enlarged view.

Particular embodiments of the subject matter described in this specification can be implemented to realize one or more of the following advantages. Enlarged views of the audio data can be displayed in separate panes of an audio interface, along with a visual representation of the full audio data, allowing a user to manipulate the audio data represented by the enlarged views while retaining the perspective provided by the visual representation of the full audio data. The user can simultaneously view enlarged views representing different portions of the audio data in different panes of a single interface. Multiple editing steps in editing the beginning and end of audio data can be avoided. Enlarged views of the beginning and ending of the audio data can be generated to improve editing of the audio data, in particular for generating audio loops. Additionally, the enlarged views can allow a user to verify or repair a transition from the end of one audio track to the beginning of another audio track (e.g., between consecutive audio tracks on a typical music compact disk). The user can perform small fades at the beginning and end of an audio file to eliminate clicks, pops, or other audio anomalies at occurring at the ends of the audio data efficiently.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 6 is a flow chart of an example method for playing audio data.

FIG. 8 is a flow chart of an example method for editing audio data.

Like reference numbers and designations in the various drawings indicate like elements.

DETAILED DESCRIPTION

Figure 1:
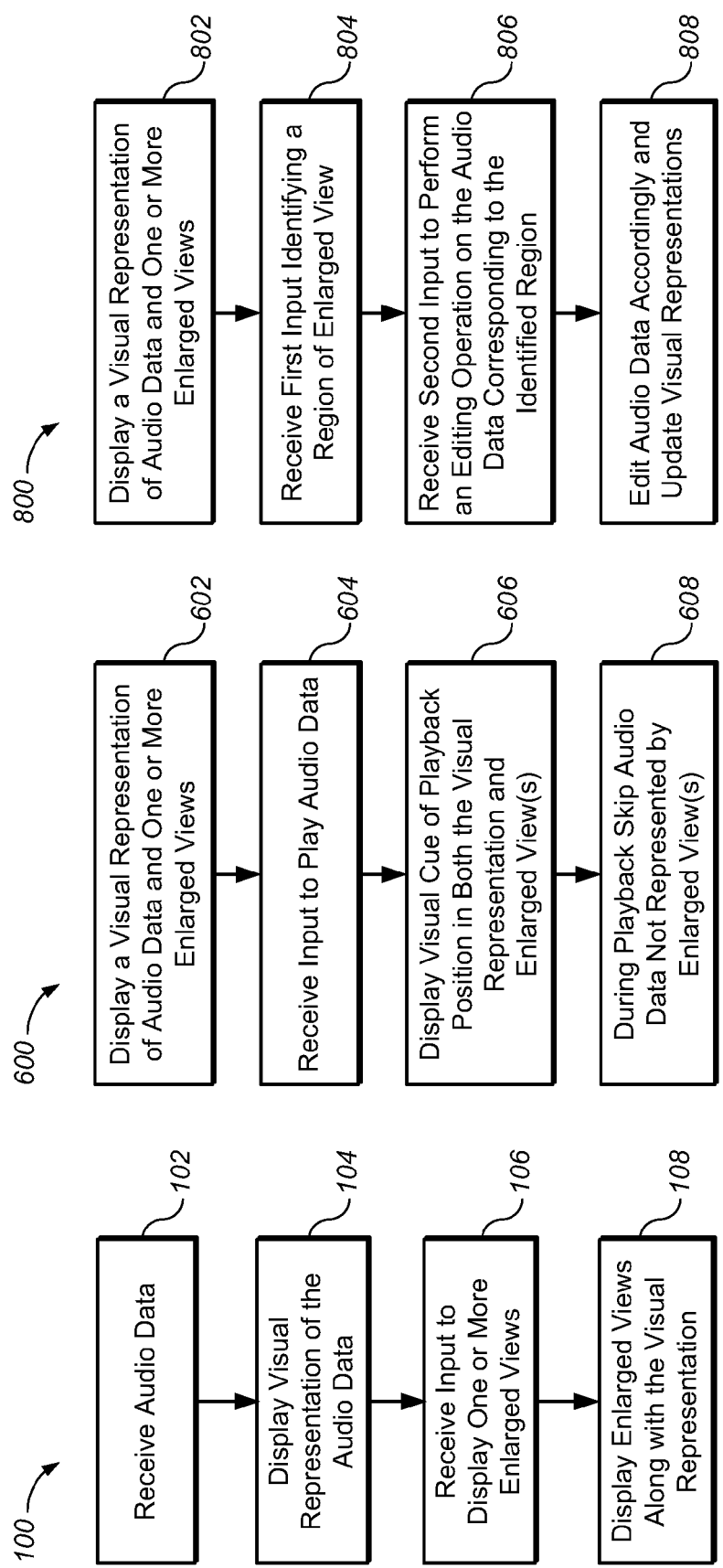
FIG. 1 is a flow chart of an example method for displaying enlarged views of portions of audio data.

FIG. 1 is a flow chart of an example method for displaying enlarged views of portions of audio data. For convenience, the method 100 is described with respect to a system that performs the method 100. The system receives 102 digital audio data. The audio data is received, for example, as part of an audio file (e.g., a WAV, MP3, or other audio file). The audio file can be locally stored or retrieved from a remote location. The audio data can be received, for example, in response to a user selection of a particular audio file (e.g., an audio file having one or more tracks of audio data).

The system displays 104 a visual representation of the audio data. For example, a particular feature of the audio data can be plotted and displayed in a window of a graphical user interface. The visual representation can be selected to show a number of different features of the audio data. In some implementations, the visual representation displays a feature of the audio data on a feature axis and time on a time axis. For example, visual representations can include a frequency spectrogram, an amplitude waveform, a pan position display, or a phase display.

In some implementations, the visual representation is an amplitude waveform. The amplitude waveform shows audio intensity (i.e., amplitude) in the time-domain (e.g., a graphical display with time on the x-axis and intensity on the y-axis). In some implementations, the visual representation is presented in an audio interface that allows a user to zoom-in or out to provide visual representations of audio data showing different levels of magnification. For example, the user can zoom-into a portion of the audio waveform both in terms of intensity and time. Zooming allows the user to view a visual representation of the portion of the audio data in greater detail.

In some alternative implementations, the visual representation is a frequency spectrogram. The frequency spectrogram shows audio frequency in the time-domain (e.g., a graphical display with time on the x-axis and frequency on the y-axis). Additionally, the frequency spectrogram can show intensity of the audio data for particular frequencies and times using, for example, color or brightness variations in the displayed audio data. In some alternative implementations, the color or brightness can be used to indicate another feature of the audio data e.g., pan position.

In other implementations, the visual representation is a pan position or phase display. The pan position display shows audio pan position (i.e., left and right spatial position) in the time-domain (e.g., a graphical display with time on the x-axis and pan position on the y-axis). The phase display shows the phase of audio data at a given time. Additionally, the pan position or phase display can indicate another audio feature (e.g., using color or brightness) including intensity and frequency.

Figure 2:
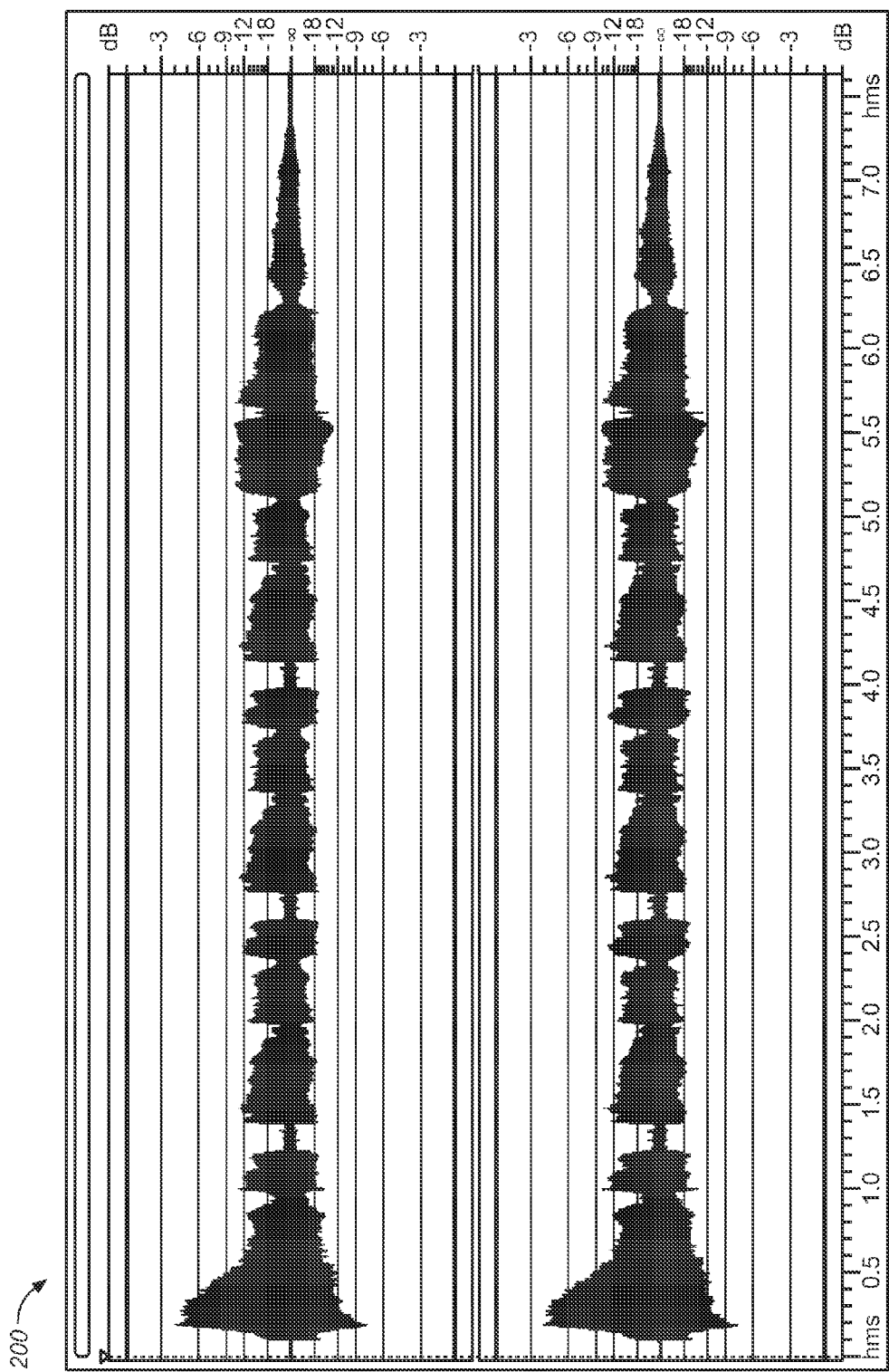
FIG. 2 is an example display of a visual representation of audio data.

FIG. 2 is an example display 200 of visual representation of audio data. The display 200 shows a two channel (e.g., left and right stereo channels) amplitude waveform representation 202 of the audio data. The display 200 shows amplitude on the y-axis in decibels (dB) and time on the x-axis. The amplitude waveform representation 202 is generated, for example, by analyzing the audio data to determine amplitude values of the audio data and plotting the values with respect to time. In some implementations, not shown, the amplitude waveform representation 202 is colored or otherwise indicates (e.g., according to brightness) another audio feature (e.g., frequency of the audio data at that amplitude and time).

As shown in FIG. 1, the system receives 106 an input to display one or more enlarged views of portions of the visual representation of the audio data. The visual representation can be an amplitude waveform, frequency spectrogram, pan display, or phase diagram, however, for convenience an amplitude waveform is described. The one or more enlarged views can correspond to the same type of display as the visual representation (e.g., the enlarged views can be amplitude waveforms when the visual representation is an amplitude waveform).

The one or more enlarged views, which are referred in some implementations as top and tail views, display one or more portions of the audio data as separate visual representations in a display interface (e.g., an interface of an audio editing application). The interface can be separated into multiple panes such that the enlarged views can be positioned in the interface along with the visual representation of the entire audio data. The enlarged view can be a magnified portion of the visual representation or alternatively, a portion of the visual representation presented at a same scaling relative to the visual representation. Additionally, the interface can provide side by side visual representation such that, for example, the one or more enlarged views and the visual representation share one or more display axes (e.g., each can share a feature scale provided by a single y-axis).

Figure 3:
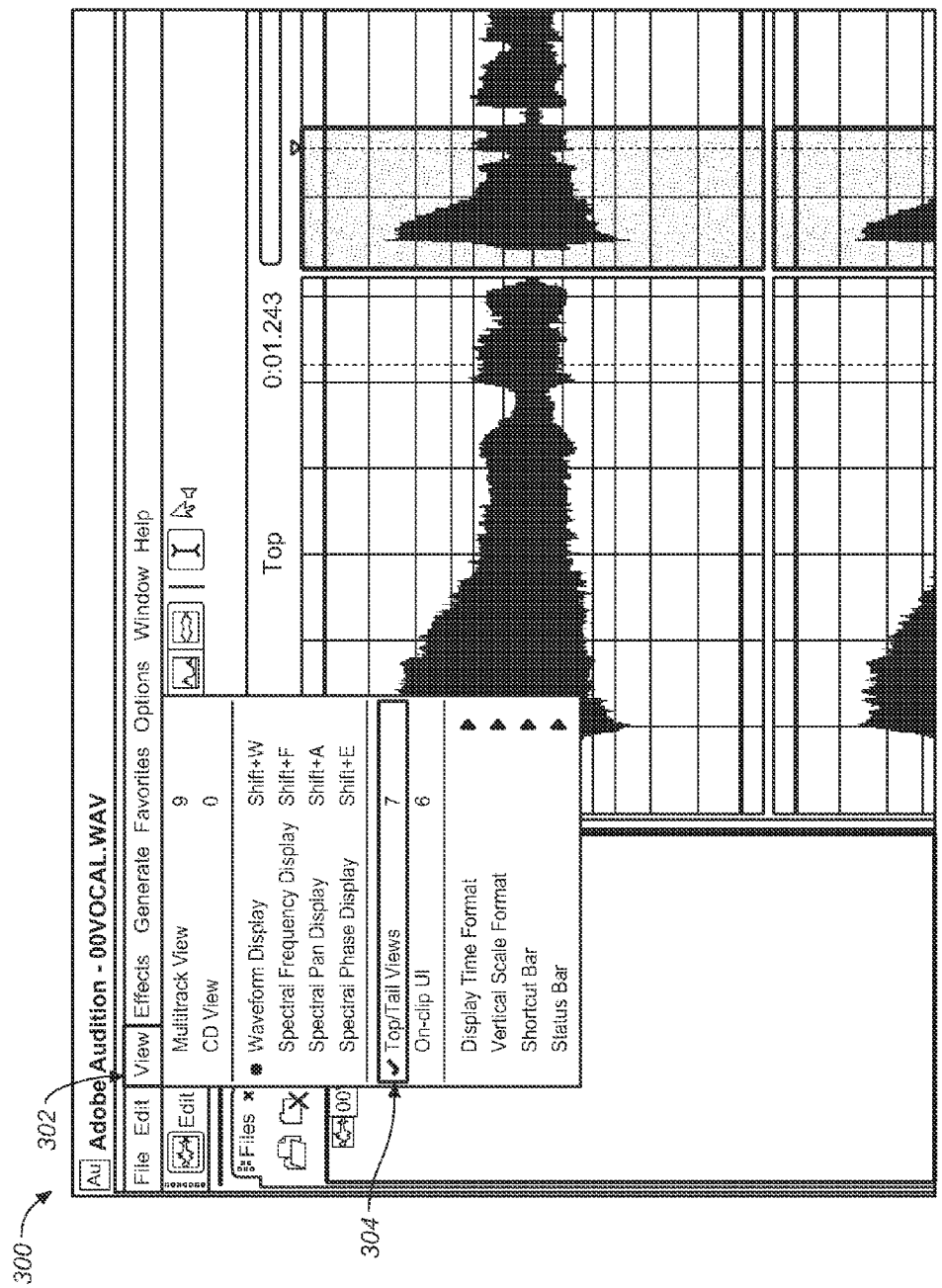
FIG. 3 is an example display for selecting a multi-pane display including enlarged views of audio data.

In some implementations, the input is received from a user, for example, according to a menu selection. FIG. 3 is an example display 300 for selecting a display including one or more enlarged views of the visual representation of audio data. Display 300 shows, for example, an interface of an audio editing application. A view menu 302 is displayed and includes a selection for top/tail views 304. Selecting the top/tail views 304 provides a display of the one or more enlarged views along with the visual representation of audio data. Deselecting the top/tail views 304 displays or returns to the display of the visual representation of the audio data without any enlarged views.

As shown in FIG. 1, the system displays 108 the one or more enlarged views along with the visual representation of the audio data. In particular, the system generates visual representations of specified portions of the audio data included in the enlarged views and displays them along with the visual representation of the audio data (e.g., in separate panes of a single interface). In some implementations, the specified portions are a portion at the beginning of the visual representation (e.g., corresponding to a beginning of the audio data) and a portion at the end of the visual representation (e.g., corresponding to an end of the audio data). Similarly, the visual representation displayed with the enlarged views can correspond to the full audio data (e.g., of a selected track).

For example, the first ten seconds and the final ten seconds of the audio data can be separately displayed as enlarged views of those portions of the audio data provided in the full visual representation of the audio data. The enlarged view, for example, can provide additional detail in the visual representation by having a waveform that is less compressed with respect to time. For example, the visual representation of the audio data can span minutes or hours of audio duration. Thus, the first few seconds or last few seconds in the shown in the visual representation can be difficult to distinguish. Additionally, while a user can zoom-into a beginning of the full visual representation of the audio data, the end of the audio data will no longer be displayed.

Figure 4:
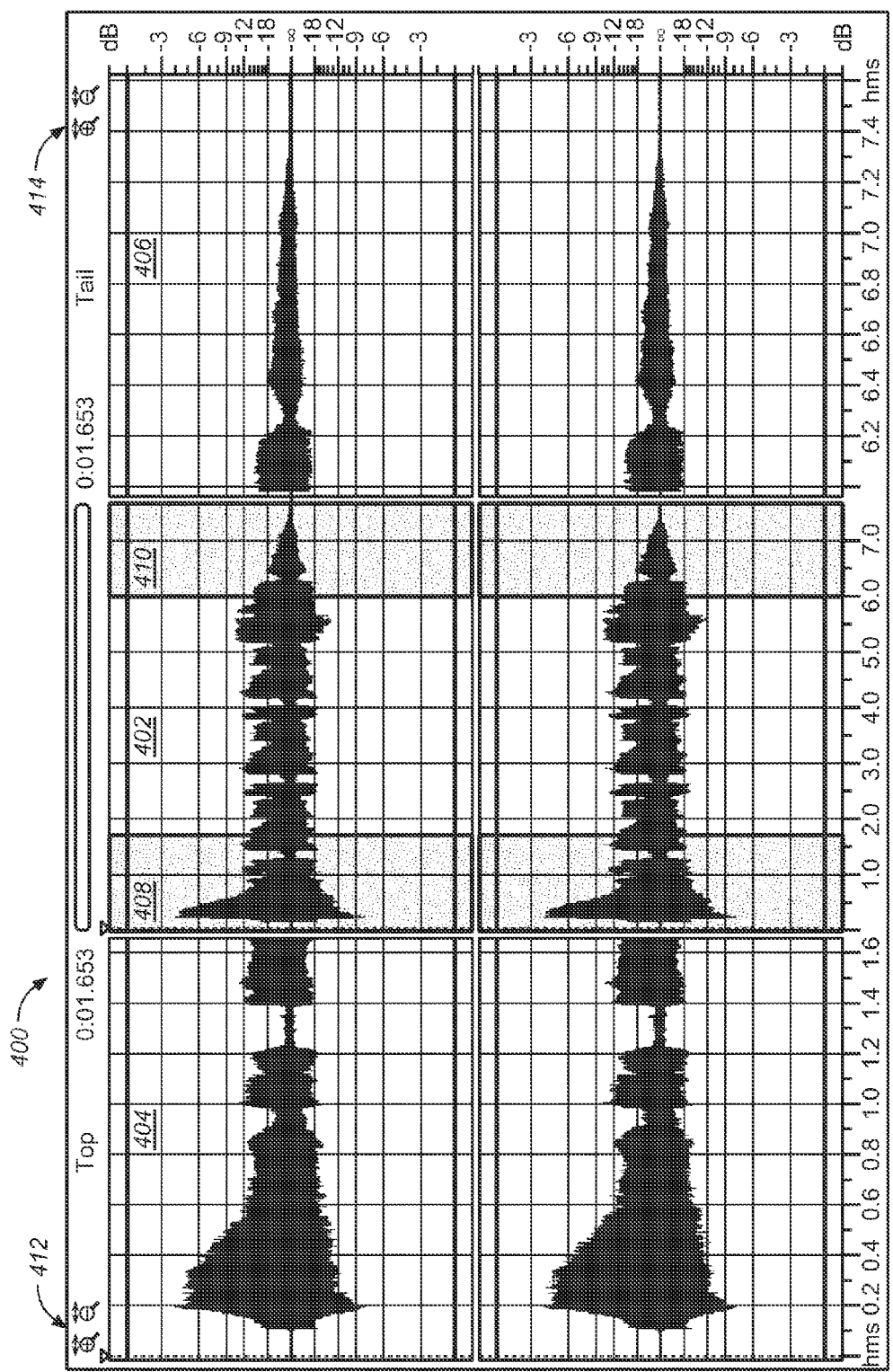
FIG. 4 is an example display including enlarged views of the visual representation of audio data shown in FIG. 2.

FIG. 4 is an example display 400 including enlarged views of the visual representation of audio data in FIG. 2. The display 400 provides a single interface that includes a visual representation 402 of the audio data as a waveform representation as well as a first enlarged view 404 and a second enlarged view 406 (e.g., in separate panes of the interface). As with the display 200 of FIG. 2, a two channel display is provided. However, the audio data can include any number of channels. The visual representation can display the entire audio data. For example, the visual representation can display audio data corresponding to a duration of substantially 8 seconds, as shown in the x-axis of the visual representation 402 representing the entire duration of the audio data.

The first enlarged view 404 provides an amplitude waveform representation of audio data corresponding to a portion of the audio data in the visual representation 402. In particular, the first enlarged view 404 displays audio data from the beginning of the audio data to a specified time. For example, the first enlarged view 404 is shown has displaying an amplitude waveform representing the audio data from 0 seconds to substantially 1.65 seconds. While the x-axis for the first enlarged view 404 covers time in a different range and magnification as the visual representation 402, the y-axis showing amplitude is the same for the first enlarged view 404 as for the visual representation 402. Thus, the enlarged view 404 is stretched in time compared to the visual representation 404.

The portion of the visual representation 402 included in the first enlarged view 404 is visually shown as a corresponding highlighted portion 408 within the visual representation 402. Thus, the highlighted portion 408 corresponds to the visual representation of audio data shown in the first enlarged view 404. The highlighted portion 408 can be a provided using a particular shading, demarcation, or other visual cue identifying the portion of the visual representation 402.

The second enlarged view 406 provides a waveform representation audio data corresponding to a portion of the audio data in the visual representation 402. In particular, the second enlarged view 406 displays audio data from a point in the audio data to the end of the audio data. For example, the second enlarged view 406 is shown has displaying an amplitude waveform representing the audio data from substantially 6 seconds to substantially 8 seconds seconds. The x-axis for the second enlarged view 406, like the x-axis for the first enlarged view 404, covers time in a different range and magnification as the visual representation 402. Additionally, the y-axis showing amplitude is the same for the second enlarged view 406 as for the visual representation 402.

The portion of the visual representation 402 included in the second enlarged view 406 is visually shown as a corresponding highlighted portion 410 within the visual representation 402. Thus, the highlighted portion 410 corresponds to the visual representation of audio data shown in the second enlarged view 406.

The display 400 separates the visual representation 402 and the first and second enlarged views 404 and 406 into panes of equal size in the interface. Thus, since the first and second enlarged views 404 and 406 cover a smaller duration of the total audio data, they are shown with a magnified time scale. In some alternative implementations, however, the visual representations are not equally sized. For example, the enlarged views can be smaller or larger than the visual representation of the entire audio data. In some implementations, a single y-axis is used for all panes in the interface (e.g., for each visual representation including the one or more enlarged views). As a result, any change in the visual representation with respect to the y-axis (e.g., zooming in with respect to amplitude) is reflected in each visual representation of the interface. Alternatively, each pane can provide independent axes.

In some implementations, the enlarged views are zoomable. For example, a user can zoom-in or zoom-out of the enlarged view. In some implementations, the zoom is with respect to the x-axis (e.g., time) only. For example, the user can position a cursor within the enlarged area and execute a function (e.g., roll track wheel, right click operation) to zoom-in or out of the visual representation presented in the enlarged view. Thus, for example, the user can increase the magnification provided on the time axis to more carefully identify details of the displayed waveform with respect to time. For example, if the enlarged view displays a visual representation of audio data from time covering seconds, the user can zoom-in such that the enlarged view displays a visual representation covering only 1 second.

Alternatively, zooming buttons can be provided within the interface displaying the enlarged view. For example, in FIG. 4, the display 400 includes zooming buttons 412 for the first enlarged view and zooming buttons 414 for the second enlarged view. The zooming buttons 412 and 414 include a zoom-in button (indicated by a magnifying glass including a "+" sign) and a zoom-out button (indicated by a magnifying glass including a "−" sign). Additionally, the respective zooming buttons 412 and 414 each include horizontal arrows indicating that the zooming is with respect to time only and not amplitude. Thus, in some implementations, the feature represented by the y-axis is constant for the visual representations, including enlarged views, displayed in respective panes of the interface. Alternatively, in other implementations, modifying (e.g., by zooming) with respect to the y-axis adjusts all visual representations in a similar manner.

In some implementations, the enlarged views are linked together such that zooming in on one enlarged view correspondingly zooms into the other enlarged views. For example, if the user zooms-in to the first enlarged view 404, the second enlarged view 406 will zoom-in by a corresponding amount. Additionally, the highlighted regions of the visual representation illustrating the portions of the audio data shown in the enlarged views change to match the zooming applied to the enlarged views (e.g., narrower highlighted region displayed when zoomed-in).

In some implementations, performing a zoom-in of an enlarged view fixes an endpoint in the visual representation provided by the enlarged view after zooming. For example, when zooming in on an enlarged view including the beginning of the audio data (e.g., the first enlarged view 404), the zoomed visual representation in the enlarged view can always start at time zero (i.e., the visual representation always starts at the beginning of the audio data). For example, if the enlarged view prior to zooming displays a visual representation of audio data from time t=0 second to time t=10 seconds is zoomed to only display 1 second of audio data, the enlarged view after zooming automatically displays a representation of the audio data from time t=0 seconds to time t=1 second.

Similarly, when zooming in to an enlarged view including the end of the audio data (e.g., the second enlarged view 406), the zoomed visual representation of the portion of the audio data can always end with the end of the audio data. For example, if the enlarged view prior to zooming displays a visual representation of audio data from time t=8 minutes, 50 second to time t=9 minutes is zoomed to only display 1 second of audio data, the enlarged view after zooming automatically displays a representation of the audio data from time t=8 minutes, 59 seconds to time t=9 minutes. In other implementations, other fixed points for zooming can be used including the center of the visual representation of the portion of the audio data prior to the zooming operation.

In some implementations, the duration of time associated with each enlarged view is specified by a default value (e.g., 10 seconds). Alternatively, a user can specify a particular duration. Additionally, in some implementations, the duration for each enlarged view is the same. Alternatively, the enlarged views can cover time ranges separately specified (e.g., 10 seconds from the beginning of the audio data in one enlarged view and 5 seconds at the end of the audio data for a second enlarged view).

Figure 5:
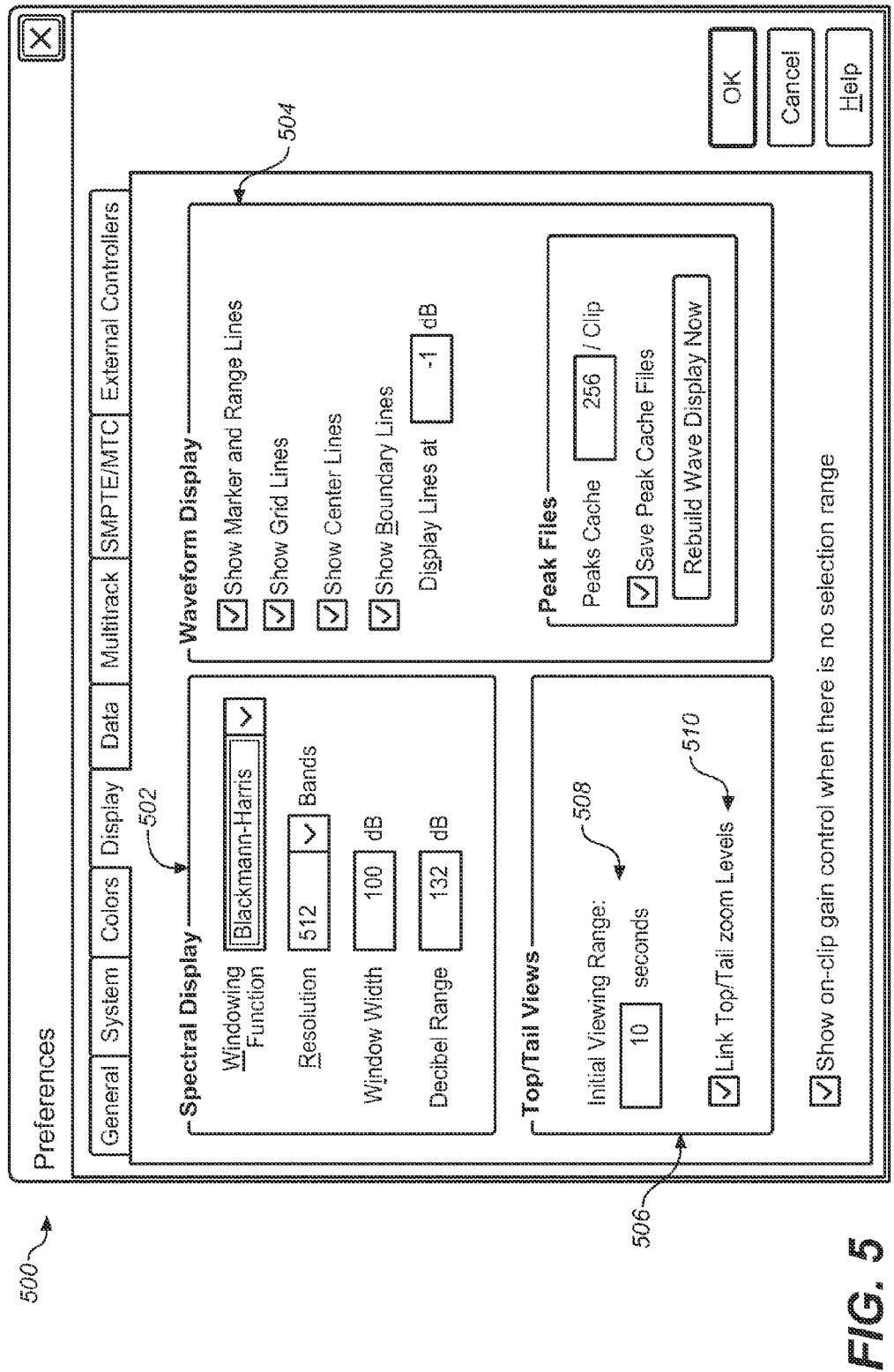
FIG. 5 is an example preferences display.

FIG. 5 is an example preferences display 500 for setting preferences associated with displaying visual representations of audio data included in the enlarged view. Spectral display properties 502 identify preferences with respect to frequency spectrogram visual representations of the audio data (e.g., how many frequency bands, the type of processing performed on the audio data) when a frequency spectrogram is displayed. Similarly, the waveform display properties 504 identify preferences for displaying a waveform visual representation of the audio data including providing grid lines, spacing between grid lines, and center point) when an amplitude waveform is displayed.

The preferences display 500 also includes top/tail preferences 506. The top/tail preferences 506 identify preferences for the enlarged views of portions of the audio data. For example, initial viewing range 508 specifies the time range of the enlarged views when generated. For example, initial viewing range 508 indicates 10 seconds. Accordingly, when a user provides an input to display the one or more enlarged views, each enlarged view includes a visual representation of audio data having a range of 10 seconds. For example, for a top and tail view, the first and last 10 seconds are used to generate the enlarged views.

Additionally, a link zoom levels 510 allows the user to link the enlarged views such that zooming one enlarged view results in a corresponding zoom-in the other enlarged views. For example, if a user zooms-in on a first enlarged view to modify the visual representation to display only one second of audio data, the one or more other enlarged views are similarly modified.

FIG. 6 is a flow chart of an example method 600 for playing audio data. For convenience, the method 600 is described with respect to a system that performs the method 600. The system displays 602 a visual representation of audio data and one or more enlarged views of the audio data. In some implementations, the system displays the visual representation and one or more enlarged views according to a received input as described with respect to FIG. 1.

The system receives 608 an input to play the audio data. The input can be received from an interface including a visual representation of the audio data and one or more enlarged views of the visual representation (e.g., interface 400 of FIG. 4 including an enlarged view corresponding to the beginning of the audio data and an enlarged view corresponding to the end of the audio data). For example, a user can select a particular menu item or button in the interface to play some or all of the audio data.

The system displays 606 a visual cue corresponding to playback position in both the visual representation and a corresponding enlarged view. For example, the display can include a marker in the visual representation of the audio data indicating the playback position. The marker can initially be positioned at the beginning of the visual representation (i.e., time zero of the audio data). Additionally, for an enlarged view including the beginning of the audio data, a corresponding marker can be positioned at the beginning of the enlarged view (e.g., also at time zero). In some implementations, the visual cue is present whenever the audio data is displayed such that it is present prior to an input to play the audio data (i.e., the visual cue is not contingent on initiating a playback operation).

During playback, the system skips 608 audio data outside of the audio data represented by the one or more enlarged views. For example, the first enlarged view can include a visual representation of the first ten seconds of audio data. The second enlarged view can include a visual representation of the last ten seconds of audio data. During playback, the first ten seconds are played followed by the last ten seconds without playing any intervening audio data. The visual cue tracks the playback with respect to position over time.

When the playback jumps from the audio data of the first enlarged view to the second enlarged view, the visual cue moves from the visual representation of the first enlarged view to the visual representation of the second enlarged view. Similarly, in the visual representation of the audio data (e.g., the full audio data), the visual cue skips past the intervening audio data not included in the enlarged views (e.g., jumps from shaded region 408 to shaded region 410 of FIG. 4).

In some implementations, when the playback reaches the end of the audio data, the playback begins again at the beginning. This can be useful, for example, in building looped audio data such that the entire audio data repeats for a specified time or until stopped by a user.

Figure 7:
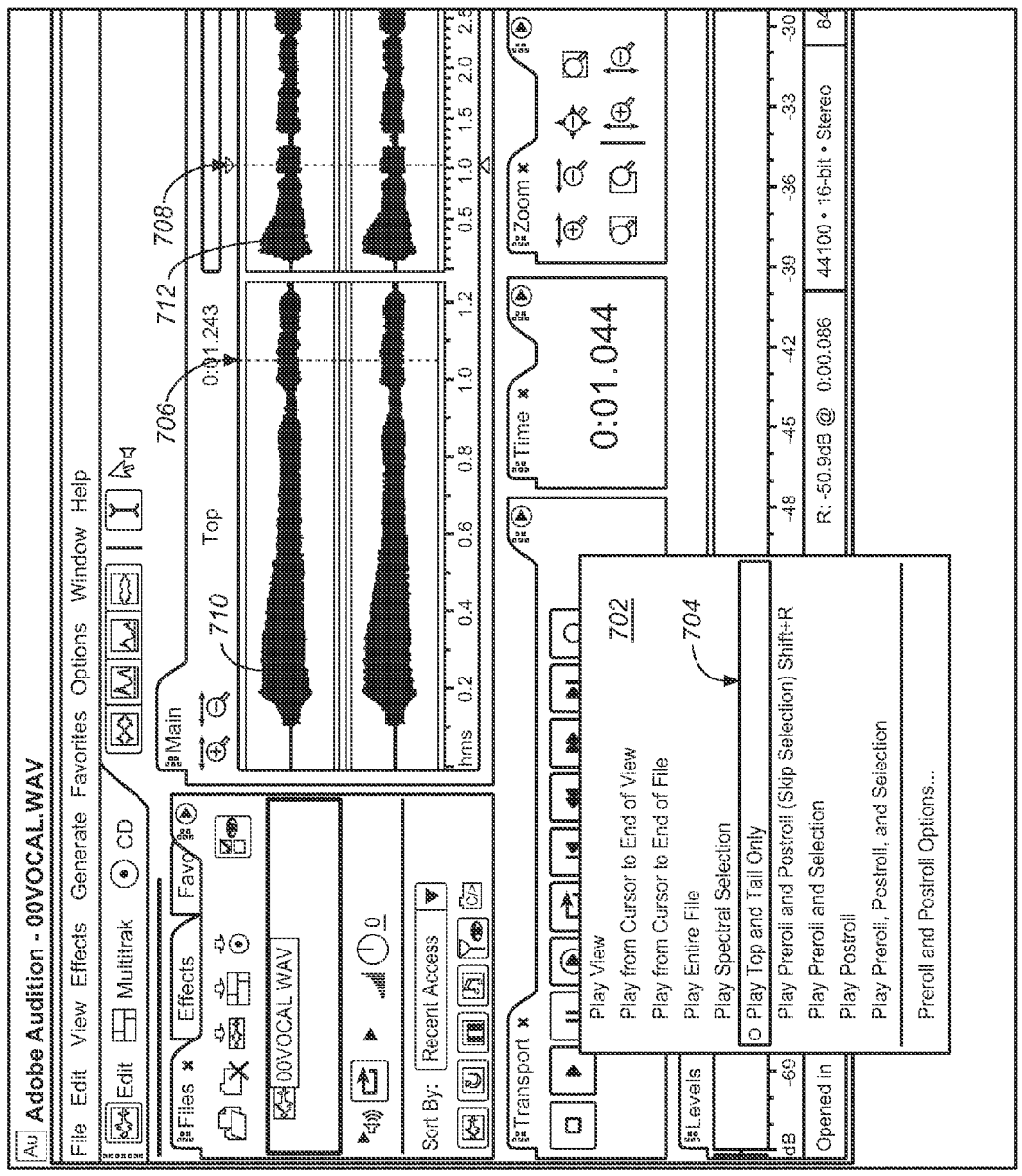
FIG. 7 is an example audio interface including a playback preferences menu.

FIG. 7 is an example audio interface portion 700 including a playback preferences menu 702. The audio interface portion 700 includes a portion of the displayed audio data including a first enlarged view 710 and a partial view of the visual representation 712 of the audio data. A second enlarged view can be included (not shown). Additionally, the first enlarged view 710 includes a marker 706 indicating a position of playback relative to the displayed waveform representation. Similarly, the visual representation 712 includes a corresponding marker 708 indicating the position of playback relative to the visual representation 712.

The playback preferences menu 702 includes a number of different playback options that the user can select. For example, the playback preferences menu 702 includes options to play the entire file or to play a spectral selection (e.g., a portion of the visual representation demarcated by a user selection). Additionally, the playback preferences menu 702 includes an option to play the enlarged views only 704 (referred to in FIG. 7 as "play top and tail only"). When selected by the user, the playback begins with the first enlarged view and once reaching the end of the first enlarged view jumps to the beginning of a next enlarged view. Any other audio data in the visual representation that is not part of an enlarged view is skipped (i.e., not played).

FIG. 8 is a flow chart of an example method for editing audio data. For convenience, the method 800 is described with respect to a system that performs the method 800. The system displays 802 a visual representation of audio data and one or more enlarged views of the audio data. In some implementations, the system displays the visual representation and one or more enlarged views according to a received input as described with respect to FIG. 1.

The system receives 804 a first input identifying a region of an enlarged view. The input can be a user selection of a region within the enlarged view. For example, the user can use a selection tool (e.g., a rectangle tool for forming a marquee selection or other editing tool including brush tools) to select a region of the audio data represented in the enlarged view.

The system receives 806 a second input to perform an editing operation on the audio data corresponding to the identified region. The user can select an editing operation to perform, for example, from a menu selection in the interface. For example, editing operations can be listed in an editing menu. Alternatively, a user action can initiate a menu, for example, a mouse right click. In some implementations, the specific selection tool used to select the region of the enlarged view can be associated with a particular editing operation.

In some implementations, the user selects an editing operation in order to provide smooth looping between the beginning and end of the audio data. For example, when looping the audio data a discontinuity can result at the boundary between the end of the audio data and the beginning of the audio data. The discontinuity can result, for example, because the beginning and ending audio data are not continuous (e.g., there is a difference in amplitude, frequency, phase, or other audio properties). The discontinuity can result in audible click or other result that prevents smooth continuous looping.

The user can use enlarged views at the beginning and end of the audio data to identify edits to perform as well as to select the appropriate audio data to edit according to the displayed visual representation of the audio data in the enlarged views. For example, a fading operation can be performed at the beginning and ending of the audio data to smooth the transition of a loop from the end of the audio data to the beginning.

Other editing operations can be performed such that the transition from the end of the audio data back to the beginning of the audio data is perceived (e.g., by a listener) as continuous.

The system edits 808 the audio data accordingly and updates the visual representations. For example, if the editing operation is to perform compression on the audio data in the selected region, the system can compress that audio data and then update the visual representations of that audio data to reflect the compression (e.g., by shown the waveform in the region as having a lower amplitude corresponding to the applied compression). The visual representation of both the enlarged view and the visual representation of the whole audio data can both be updated. In some implementations, each displayed visual representation appropriately updates as the editing operation is being performed.

Editing the audio data can include, for example, isolating the audio data of the identified region and performing an editing operation on the audio data of the identified region. Isolating the audio data can performed using, for example, Fourier transforms or filters. After editing the isolated audio data, the edited isolated audio data can be combined (e.g., by mixing) with the audio data outside the identified region to form edited audio data.

After editing, the audio data can be stored for later playback, transmission, or other processing. Additionally, the user can remove the enlarged views leaving only the visual representation of the audio data.

Figure 9:
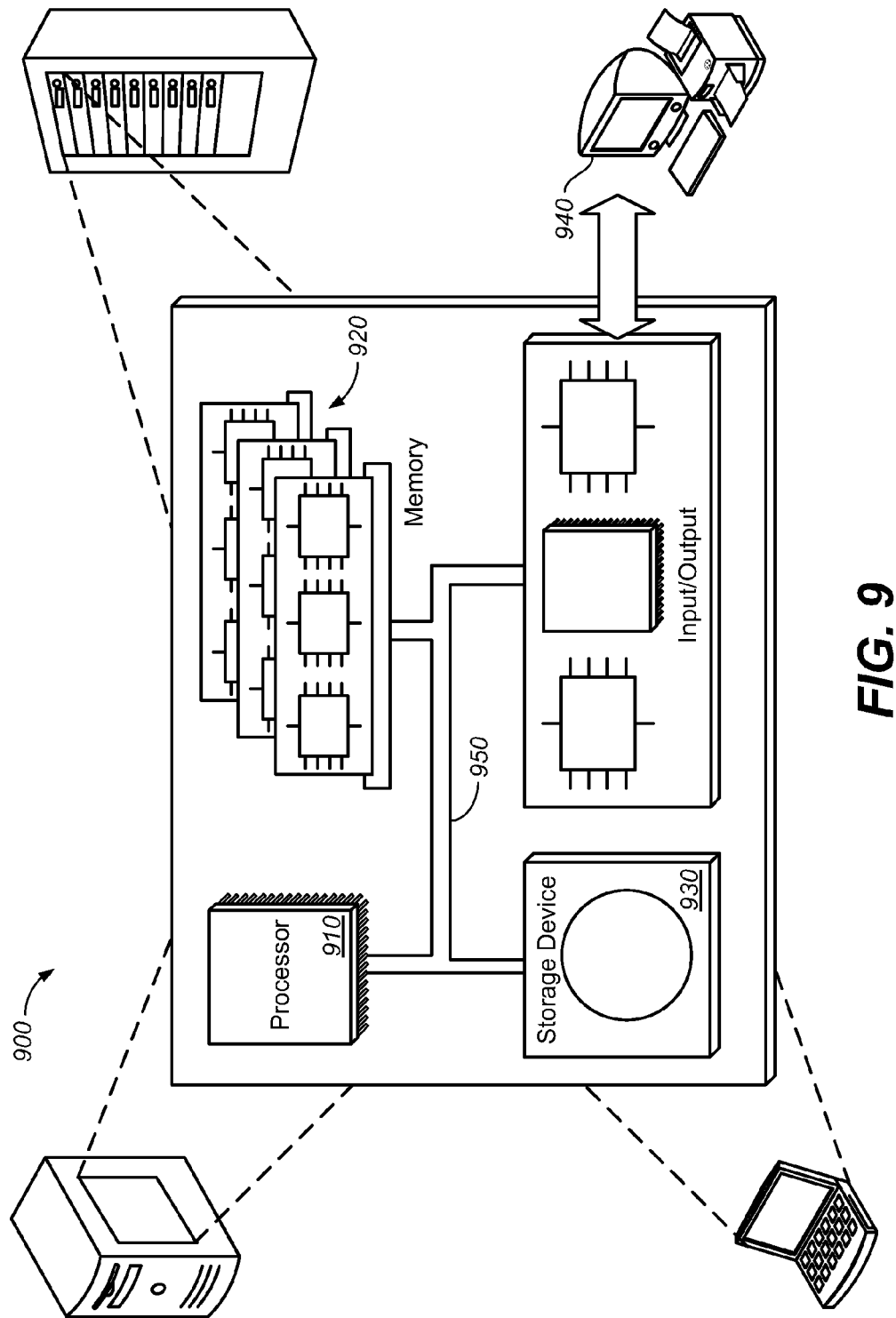
FIG. 9 is a schematic diagram of a generic computer system.

FIG. 9 is a schematic diagram of a generic computer system 900. The system 900 can be used for practicing operations described in association with the technique 100 of FIG. 1 in one embodiment, the technique 600 of FIG. 6 in one embodiment, or the technique 800 of FIG. 8 in another embodiment. The system 900 can include a processor 910, a memory 920, a storage device 930, and input/output devices 940. Each of the components 910, 920, 930, and 940 are interconnected using a system bus 950. The processor 910 is capable of processing instructions for execution within the system 900. Such executed instructions can implement one or more components of system 900, for example. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 is a computer readable medium such as volatile or non volatile that stores information within the system 900. The memory 920 could store data structures representing history trees and reduced history trees for complex solids, for example. The storage device 930 is capable of providing persistent storage for the system 900. The storage device 930 may be a floppy disk device, a hard disk device, an optical disk device, or a tape device, or other suitable persistent storage means. The input/output device 940 provides input/output operations for the system 900. In one implementation, the input/output device 940 includes a keyboard and/or pointing device. In another implementation, the input/output device 940 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving digital audio data;
   displaying a first visual representation of the audio data in an interface, the visual representation displaying audio data as a function of time on a time axis and a feature on a feature axis;
   receiving an input to display distinct enlarged views of the visual representation of the audio data;
   displaying a visual representation of the distinct enlarged views along with the visual representation of the audio data in the interface, wherein the enlarged views of the visual representation of the audio data include a a first enlarged view displaying audio data corresponding to a beginning of the audio data from time zero to a first specified point in time and a second enlarged view displaying audio data corresponding to a second specified point in time to the end point of the audio data, wherein the second specified point in time occurs after the first specified point in time;
   receiving an input to play the audio data; and
   skipping playback of audio data outside the enlarged views of the visual representation, wherein the skipping of the playback comprises playing the audio data associated with the first enlarged view and then continuously playing the audio data associated with the second enlarged view by smoothing the transition between the two enlarged views and omitting the audio data intervening between the first specified point in time and the second specified point in time.

2. The method of claim 1, wherein the visual representation of the audio data includes respective indicators identifying the portion of the audio data represented by each of the respective enlarged views.

3. The method of claim 1, where displaying the visual representation of the enlarged views along with the visual representation of the audio data includes generating separate visual representations corresponding to the visual representation and each of the enlarged views in separate panes of the interface.

4. The method of claim 3, where the visual representation includes visual cues illustrating portions of the visual representation corresponding to the audio data represented in the respective enlarged views.

5. The method of claim 1, further comprising:
   displaying a visual cue of playback location in both the visual representation of the audio data and the visual representation of the first enlarged.

6. The method of claim 1, further comprising:
   receiving an input identifying a region of one of the enlarged views of the visual representation;
   receiving an input to perform an editing operation on the identified region;
   editing the audio data according to the editing operation; and
   updating the display of the visual representation and the edited enlarged views to reflect edited audio data.

7. The method of claim 1, further comprising:
   receiving an input associated with the first enlarged view to alter a magnification with respect to a first axis; and
   updating the displayed first enlarged view while keeping the visual representation of the audio data unchanged.

8. The method of claim 7, where updating the first enlarged view altering the magnification fixes an endpoint of the enlarged view to the updated enlarged view.

9. A computer program product, encoded on a non-transitory computer-readable medium, including instructions that when executed cause data processing apparatus to perform operations comprising:

receiving digital audio data;

displaying a first visual representation of the audio data in an interface, the visual representation displaying audio data as a function of time on a time axis and a feature on a feature axis;

receiving an input to display distinct enlarged views of the visual representation of the audio data;

displaying a visual representation of the distinct enlarged views along with the visual representation of the audio data in the interface, wherein the enlarged views of the visual representation of the audio data include a first enlarged view displaying audio data corresponding to a beginning of the audio data from time zero to a first specified point in time and a second enlarged view displaying audio data corresponding to a second specified point in time to the end point of the audio data, wherein the second specified point in time occurs after the first point in time receiving an input to play the audio data; and in response to receiving the input to play the audio data, skipping playback of the audio data outside the enlarged views of the visual representation, wherein the skipping of the playback comprises playing the audio data associated with the first enlarged view and then playing the audio data associated with the second enlarged view and smoothing transition between the two enlarged views while omitting the audio data intervening between the first enlarged view and the second enlarged view.

10. The computer program product of claim 9, wherein the visual representation of the audio data includes respective indicators identifying the portion of the audio data represented by each of the respective enlarged views.

11. The computer program product of claim 9, where displaying the visual representation of the enlarged views along with the visual representation of the audio data includes generating separate visual representations corresponding to the visual representation and each of the enlarged views in separate panes of the interface.

12. The computer program product of claim 11, where the visual representation includes visual cues illustrating portions of the visual representation corresponding to the audio data represented in the respective enlarged views.

13. The computer program product of claim 9, wherein the instructions, when executed, further cause data processing apparatus to perform operations further comprising:

displaying a visual cue of playback location in both the visual representation of the audio data and the visual representation of the first enlarged view.

14. The computer program product of claim 9, wherein the instructions, when executed, further cause data processing apparatus to perform operations further comprising:

receiving an input identifying a region of one of the enlarged views of the visual representation;

receiving an input to perform an editing operation on the identified region;

editing the audio data according to the editing operation; and updating the display of the visual representation and the edited enlarged views to reflect edited audio data.

15. The computer program product of claim 9, wherein the instructions, when executed, further cause data processing apparatus to perform operations further comprising:

receiving an input associated with the first enlarged view to alter a magnification with respect to a first axis; and updating the displayed first enlarged view while keeping the visual representation of the audio data unchanged.

16. The computer program product of claim 15, where updating the first enlarged view altering the magnification fixes an endpoint of the enlarged view to the updated enlarged view.

17. A system comprising:

a user interface device; and one or more computers operable to interact with the user interface device and to:

receive digital audio data;

display a first visual representation of the audio data in an interface, the visual representation displaying audio data as a function of time on a time axis and a feature on a feature axis;

receive an input to display distinct enlarged views of the visual representation of the audio data;

display a visual representation of the distinct enlarged views along with the visual representation of the audio data in the interface, wherein the enlarged views of the visual representation of the audio data include a first enlarged view displaying audio data corresponding to the audio data from a first specified point in time to a second specified point in time and a second enlarged view displaying audio data corresponding to the audio data from a third specified point in time to a fourth specified point in time, the third specified point in time occurring after the second specified point in time;

receiving an input to play the audio data; and in response to receiving the input to play the audio data, playing audio associated with the first enlarged view from the first specified point in time to the second specified point in time and then continuously playing audio associated with the second enlarged view from the third specified point in time to the fourth specified point in time, wherein audio data intervening between the second specified point in time of the first enlarged view and the third specified point in time of the second enlarged view is omitted and a smoothed transition between the audio associated with the first enlarged view and the audio associated with the second enlarged view is performed.

18. The system of claim 17, where the one or more computers comprise a server operable to interact with the user interface device through a data communication network, and the user interface device is operable to interact with the server as a client.

19. The system of claim 17, wherein the visual representation of the audio data includes respective indicators identifying the portion of the audio data represented by each of the respective enlarged views.

20. The system of claim 17, where displaying the visual representation of the enlarged views along with the visual representation of the audio data includes generating separate visual representations corresponding to the visual representation and each of the enlarged views in separate panes of the interface.

21. The system of claim 20, where the visual representation includes visual cues illustrating portions of the visual representation corresponding to the audio data represented in the respective enlarged views.

22. The system of claim 17, further comprising:
displaying a visual cue of playback location in both the visual representation of the audio data and the visual representation of the first enlarged view.

23. The system of claim 17, further comprising:
receiving an input identifying a region of one of the enlarged views of the visual representation;
receiving an input to perform an editing operation on the identified region;
editing the audio data according to the editing operation; and
updating the display of the visual representation and the edited enlarged views to reflect edited audio data.

24. The system of claim 17, further comprising:
receiving an input associated with the first enlarged view to alter a magnification with respect to a first axis; and
updating the displayed first enlarged view while keeping the visual representation of the audio data unchanged.

25. The system of claim 24, where updating the first enlarged view altering the magnification fixes an endpoint of the enlarged view to the updated enlarged view.

\* \* \* \* \*